A. Basse — Carving Machine
Pat 71568
Patented Dec. 3. 1867
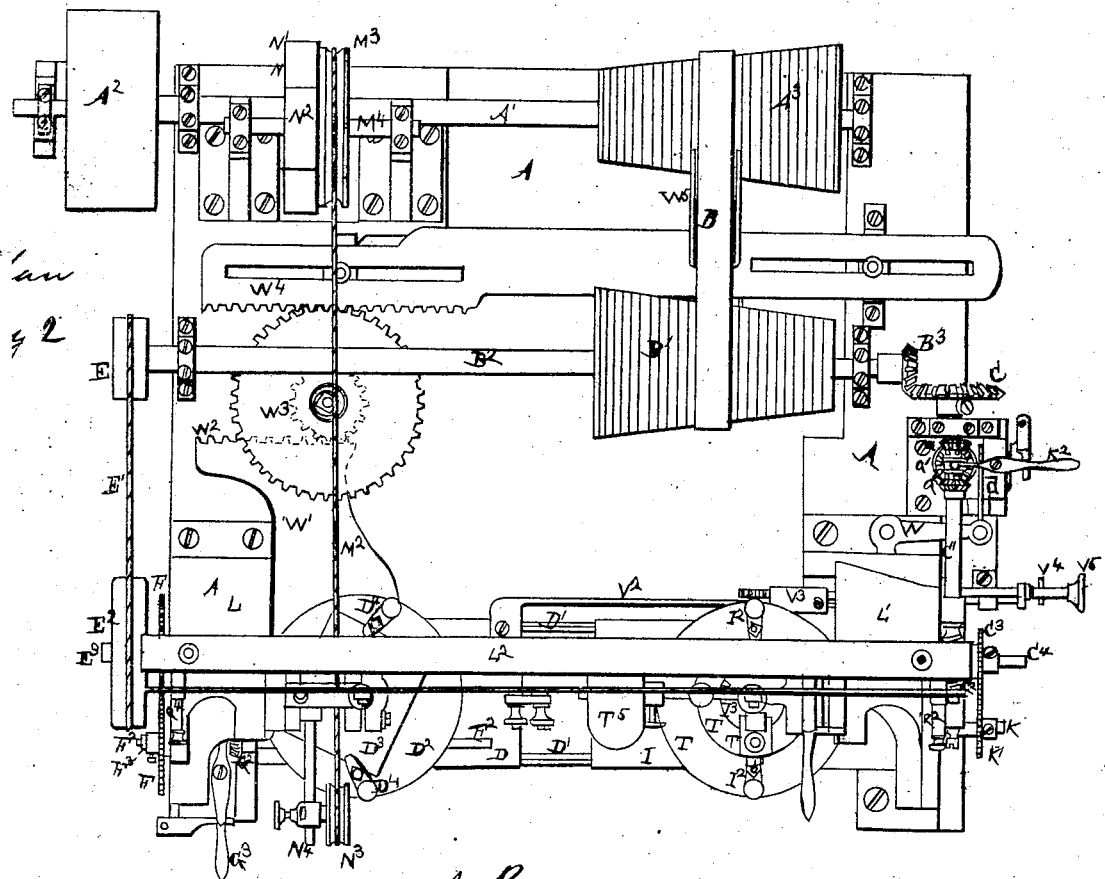
A. Basse
By his Atty J. Dennis Jr
Witnesses
Wm Dennis
Bernard Drew

United States Patent Office.

AUGUST BASSE, OF QUINCY, ILLINOIS.

Letters Patent No. 71,568, dated December 3, 1867.

---

IMPROVEMENT IN MACHINES FOR CARVING WOOD.

---

The Schedule referred to in these Letters Patent and making part of the same.

---

TO ALL WHOM IT MAY CONCERN:

Be it known that I, AUGUST BASSE, of Quincy, Adams county, State of Illinois, have invented certain new and useful Improvements in Machines for Carving Wood, Bone, Ivory, and other materials; and I do hereby declare the following description and accompanying drawings are sufficient to enable any person skilled in the art or science to which it most nearly appertains to make and use my said invention or improvements without further invention or experiment.

The nature of my invention consists in conveying the motion from the tracer to the cutter by means of slotted levers connected by a link, which may be adjusted to cut the figure carved either the same height or higher or lower than the pattern; and in constructing the coupling, which connects the cutter-shaft to the traverse-rod that works it, with a spring to press the cutter-shaft against the traverse-rod, and prevent the cutter from chattering; and in constructing the couplings which connect the levers (which convey the motion from the tracer to the cutter) to the traverse-rods with clamping-nuts, so that when the tracer and cutter are adjusted, the nuts may be clamped on the screws to prevent them from turning. In the accompanying drawings—

Figure 1 is a front elevation of a carving-machine with my improvements.

Figure 2 is a plan or top view.

Figure 3 is an elevation of the right-hand end.

In these drawings, A is a rectangular frame, supported by four legs. $A^1$ is a horizontal shaft, mounted on proper journal-boxes, fastened to the frame A, and provided with a pulley, $A^2$, for a belt from some moving power to drive the machine. $A^3$ is a cone, fastened to the shaft $A^1$, and carrying the belt B and cone $B^1$ and shaft $B^2$. The gear $B^3$ is fastened to the shaft $B^2$ to drive the gear C, and carry the shaft $C^1$ with the screw $C^2$, and turn a gear directly behind the gear $C^3$, and fastened to the screw $C^4$ to turn it, which screw, $C^4$, turns in a journal-box fastened to the frame A, and traverses the carriage D on ways $D^1$, on the front bar of the frame A. The rotating chuck $D^2$ is provided with a shaft turning in boxes in the carriage D. This chuck carries the block $D^3$, which is clamped to it by the clamps $D^4$, upon which block the figure to be carved is cut. To turn the chuck $D^2$, I fasten the pulley E to the shaft $B^2$, which pulley carries the band $E^1$, and drives the pulley $E^2$ and the shaft $E^3$ and gear F, which turns the gear $F^1$ and shaft $F^2$. Both the last-named shafts are mounted in journal-boxes on the frame A. The gear $F^1$ is not fastened directly to the shaft $F^2$, but to a tube, $F^3$, which extends through the journal-box, and has the gear G fastened to its inner end, (shown by dotted lines in fig. 2,) which gear, G, turns the gear $G^1$ on a stud in the frame, and carries the gear $G^2$, which turns loose on the shaft $F^2$. Between the gears $G^1$ and $G^2$ there is a clutch-box, arranged to traverse on the shaft, and worked by the lever $G^3$, so as to lock either of the gears G or $G^2$ to the shaft $F^2$, to turn it in either direction, as desired. The shaft $F^3$ has a groove cut in it lengthwise for the feather of the screw H, which is fitted to the shaft, and traverses on it. The screw H turns in a journal-box, $H^1$, fastened to the carriage D, which screw, H, is shown in dotted lines in fig. 1, and turns the chuck $D^2$, by working in a gear fastened to the shaft $H^2$ of the chuck.

It will be perceived that by this arrangement of the gears and screw H, the chuck is turned in either direction without regard to the traversing of the carriage. On the opposite end of the ways $D^1$ there is a carriage, I, similar to the carriage D, with a rotating chuck, $I^1$, and clamps, $I^2$, to hold and carry the pattern $I^3$ of the figure to be carved. The carriage I is traversed by the screw K, turned by the gear $K^1$, which is turned by the gear $C^3$, before described. The shaft $E^3$ extends across the carriage D, on to the carriage I, and has a groove in it for a feather in the screw J, which turns in the journal-box $J^1$, and turns the gear $J^2$ on the shaft $J^3$ of the chuck $I^1$, to turn it independently of the traversing of the carriage I. The gear C, before described as turning the shaft $C^1$, is fastened to a tube that turns loose on the shaft and extends through the journal-box, and has the gear $a$ fastened to it, which turns the gear $a^1$ and drives the gear $a^2$ in the opposite direction from the gear $a$, which gear, $a^2$, also turns loose on the shaft $C^1$. A clutch-box is arranged on the shaft $C^1$, between the gears $a$ and $a^2$, and is worked by the lever $K^2$, so as to lock either gear to the shaft and turn it in either direction, as required, and move the carriages D and I to the right or left, as may be desired. I make two stands, L and $L^1$, and fasten them to the frame A, one at each end of the ways $D^1$, and connect their upper ends to the top bar $L^2$. The stand $L^3$ is fastened to the stand L by the screw $L^4$, so that it may be adjusted higher or lower at pleasure. The stand $L^3$ has two journal-boxes for the tube M to turn in, which is provided with a pulley, $M^1$, carried by the band $M^2$ from the pulley $M^3$ on the shaft $M^4$, which turns in stands fastened to the frame A, and is carried by the band N from the pulley $N^1$ on the shaft $A^1$, to the pulley $N^2$ on the shaft $M^4$. The pulley $M^1$ has a groove for the band $M^2$, which passes entirely around it, and then passes around the stud-pulley $N^3$ before it returns to the driving-pulley $M^3$. The stud of the pulley $N^3$ is fastened in a slide, arranged to be adjusted on the arm $N^4$, fastened to the stand $L^3$, so as to tighten the band $M^2$ as required.

The tube M has a feather in it, working in a groove in the cutter-shaft P, to turn it and the cutter $P^1$, which is fitted to a socket in the shaft, and secured by a set-screw. The cutter-shaft P extends up through the tube M into the coupling-link $P^2$, which connects it to the traverse-rod $P^3$, which works through an arm, $P^4$, from the stand $L^3$. The rod $P^3$ has a groove in it, traversing on the pin $b$ in the stand $P^4$. The spiral spring $b^2$ around the shaft P acts against a nut on said shaft to keep it constantly pressed against the point of the rod $P^3$, and counteract the effect of any wear of the parts, and prevent the cutter from chattering.

The rod $P^3$ is connected by a joint, Q, and swivel-link, $Q^1$, which turns on the screw $Q^2$, fastened to the lever $Q^3$, which traverses the cutting-tool up and down to form the figure on the block $D^3$. The upper part of the link $Q^1$ is an open nut with a tightening-screw, so that by turning the link the cutter may be adjusted to the proper height, and then secured by the tightening-screw in the open nut. The lever $Q^3$ vibrates on the pivot $Q^4$ in the bar $L^2$, and has a slot in it for the pivot of the link R, which connects it with the lever $R^1$, which vibrates on the pivot $R^2$ in the stand $L^1$. This lever, $R^1$, is vibrated by the traverse-rod $R^3$, which holds the tracer $R^4$ acted upon by the pattern $I^3$.

The traverse-rod $R^3$ is connected to the lever $R^1$ by the screw S, swivel-link $S^1$, and joint $S^2$, by which the tracer may be adjusted to the pattern, in the same manner as the cutter to the block. The stand $S^3$ is fastened to the stand $L^1$ by the screw $S^4$, and it may be adjusted higher or lower, as desired. The stand $S^3$ has two horizontal rings, T T, which surround the traverse-rod $R^3$, which is three-sided; and there are three stands, $T^1$, provided with rollers, fastened to each of the rings T T, to hold and guide the traverse-rod as it moves up and down with very little friction. One of the stands, $T^1$, in each of the rings may be pressed forward to press the roller against the traverse-rod, and the rod against the other rollers by the screws $T^2$. The arm $T^3$ extends up from the stand $S^3$ to form a fulcrum for the lever $T^4$, which extends through the traverse-bar $R^3$, and has the adjustable weight $T^5$ to press the tracer against the pattern. The screw V turns in the lever $T^4$, and should be set so that its point will rest on the ring T, and prevent the tracer from being depressed by the weight below the plane of the pattern. The lever $V^1$ is hinged to the lever $T^4$, to lift it with the traverse-rod and tracer and cutter, when required. The bar $V^2$ is fastened to the carriage D, and has two stops on it, one of which is seen at $V^3$, which stops are adjusted by the screws $V^4$ and $V^5$ to act on the bell-crank W, which is connected by the bar $d$ to the lever $K^2$, and is so arranged as to throw the clutch-box from the gears $a$ and $a^2$, and stop the traverse motion of the carriages when the tracer comes to the edge of the pattern or at the proper point. To make the carriages traverse slower and the chucks turn slower also, as the tracer and cutter work from the centre towards the circumference, I fasten the plate $W^1$, which carries the rack $W^2$, to the carriage D, so that it moves with the carriage and turns a pinion on the under side and fastened to the gear $W^3$, which gear turns on a stud fastened to the frame A, and carries the rack $W^4$, which moves the belt-shipper $W^5$, and moves the belt B from right to left on the cones, diminishing the speed of shaft $B^2$, and the traverse motion of the carriages and the rotation of the chucks. The rack $W^4$ has slots in it, fitted to guides on which it traverses, the guides being fastened to the frame A.

To operate this machine and carve a figure, the pattern of the figure to be carved is clamped on the chuck $I^1$, and the block upon which the figure is to be cut is clamped to the chuck D, and if the figure is to be cut the same height of the pattern, the link R must be set in the middle between $Q^2$ and S; but if the figure is to be cut higher than the pattern, the link must be moved to the left towards $Q^2$, and if lower than the pattern, to the right towards $R^1$. The tracer, $R^4$, is adjusted to the centre of the pattern, and the cutter, $P^1$, to the centre of the block $D^3$; and the belt B, at the large end of the cone $A^3$, and the other parts being all adjusted, the machine is set in motion. The pattern moves the tracer up and lets it down, which tracer moves the cutter with a corresponding motion, while it is turned rapidly to cut away that part of the block with which it comes in contact, and form the figure of the pattern on the block $D^3$, the chuck being turned and the carriages traversed in unison. When the carriages have moved so far as to bring the tracer the desired distance beyond the edge of the pattern, one of the stops on the bar $V^2$ moves the bell-crank W, and moves the clutch from the gear, and the carriages stop. I now turn the link $Q^1$, and move the cutter down a proper distance for a new cut, and move the lever $K^2$ to throw the clutch-box into the opposite gear, and traverse the carriages and turn the chucks in the opposite direction from which they moved before, so that the tracer and cutter will move from the circumference into the centre and complete the figure on the block $D^3$. To carve a figure the same size of the pattern, the gears $C^3$ and $K^1$ must be of the same size. To make a figure larger than the pattern, diminish the gear $C^3$ and increase the gear $K^1$; and to carve the figure smaller than the pattern, increase the size of $C^3$ and diminish the size of $K^1$. To make the figure carved the same as the pattern, the clutch at the end of the lever $G^3$ must be moved to lock the gear and make the chuck $D^2$ turn in the same direction with the pattern. To make the figure the reverse of the pattern, the clutch must be moved to make the chuck $D^2$ turn in a direction opposite to that of the pattern.

I contemplate that with a single lever, having its fulcrum between $Q^2$ and S, a concave figure may be carved from a convex pattern, or a convex figure from a concave pattern.

Having described my improvements—

I claim conveying the motion from the tracer to the cutter by means of the slotted levers $Q^3$ and $R^1$, and link R, which may be adjusted to cut the figure carved the same height of the pattern, or either higher or lower than the pattern.

I also claim constructing the coupling $P^2$, with a spring to press the cutter-shaft against the traverse-rod, substantially as described for the purposes set forth.

I claim constructing the couplings $Q^1$ and $S^2$, with clamping-nuts, as described, so that when the tracer and cutter are set or adjusted, the nuts may be clamped upon the screws to prevent them from turning.

AUGUST BASSE.

Witnesses:
  HENRY A. KESPOHL,
  LOUIS KESPOHL.